Sept. 5, 1939.   J. W. BRYCE   2,172,328
COMPARING AND SORTING DEVICE
Filed Dec. 13, 1933   5 Sheets-Sheet 1

FIG. 1.

INVENTOR
James W. Bryce
BY
W. J. Wilson
ATTORNEY

Sept. 5, 1939.  J. W. BRYCE  2,172,328
COMPARING AND SORTING DEVICE
Filed Dec. 13, 1933  5 Sheets-Sheet 2

Sept. 5, 1939.   J. W. BRYCE   2,172,328
COMPARING AND SORTING DEVICE
Filed Dec. 13, 1933    5 Sheets-Sheet 4

INVENTOR
James W. Bryce
BY
ATTORNEY

FIG. 11.

Patented Sept. 5, 1939

2,172,328

UNITED STATES PATENT OFFICE

2,172,328

COMPARING AND SORTING DEVICE

James W. Bryce, Bloomfield, N. J., assignor to International Business Machines Corporation, New York, N. Y., a corporation of New York Application December 13, 1933, Serial No. 702,116

10 Claims. (Cl. 235—61.7)

This invention relates to devices for comparing data on a record and sorting the record according to the result of the comparison.

An object of the invention is to provide means for comparing a number represented on a record card with two other numbers, comprising the limits of average amounts and means for sorting the card according to whether it contains a number smaller than the smaller of the two numbers, or larger than the larger of the two numbers, or of a value between the values of the two numbers.

A feature of the invention is the provision of devices for controlling the sorting of records according to amounts in accumulating mechanism which is operated under control of the records. The sorting devices are adjusted under control of a sensing means cooperating with the wheels of the accumulating mechanism.

Another object of the present invention is to adapt an accumulator for use as a data comparing means. When a complement of a limiting amount and a true number of an amount to be compared are added together in the accumulator, then the position of the highest order accumulator wheel at "0" or "9" indicates whether the amount is larger or smaller than the limiting amount. The highest order wheel is sensed and sorting control devices are adjusted according to the position of the wheel.

Another object of the invention is to provide means for comparing an amount with an average extending over a range of amounts. In other words, the amount may be compared with an average which is broadened to range from an upper allowable limit to a lower allowable limit. Two subtracting accumulators are used as settable comparing means or limit determining devices. The complement of the upper limiting amount is automatically computed and entered in the wheels of one accumulator. And the complement of the lower limiting amount is entered in the other accumulator in the same way. Then the true number of the amount to be compared is added in both accumulators. There results in each accumulator, either a change from a complement to a true number or the maintenance of a complemental registration, according to the magnitude of the amount entered.

If the amount is larger than the upper limiting amount, a change from complemental to true number registration occurs on both accumulators and both highest order wheels are positioned at "0". If the amount is smaller than the lower limiting amount, both accumulators retain a complemental standing and both highest order wheels are positioned at "9". Should the amount be of an allowable or average value, the lower limit accumulator is changed to true number registration and a "0" is in the highest order wheel, while the upper limit accumulator retains the "9" in the associated highest order wheel. A sensing means cooperates with the highest order wheels to sense the three different conditions that may be presented and thereby controls the sorting of record cards carrying the amounts into three different pockets.

A feature of the invention is the use of three accumulators as amount comparing devices. The accumulators are operated under control of record cards having three zones perforated with amount perforations. The one amount is a lower limiting value which is entered into one subtracting accumulator. The second amount is an upper limiting value which is entered into the second subtracting accumulator. The third amount is the amount to be compared with the limting amounts, and it is added in the third accumulator. After all three amounts are entered into the accumulators, the third accumulator is connected to the other two accumulators and the amount to be compared is read off the third accumulator and transferred to each of the other two accumulators. In each subtracting accumulator, the complement of the limiting amount is added to the amount to be compared and the result is either a complement or a true number according to the relative magnitude of the two. The highest order wheels of the subtracting accumulators are sensed to determine the result of the comparison. Then sorting devices are operated under control of the sensing means to sort the record cards according to whether they contain amounts above, below or between the limiting values.

The invention may be illustrated by a problem involving power consumption, where the power distributor is desirous of knowing when, how often, in which direction and in what amounts the kilowatt consumption of a customer departs from an average.

The average monthly consumption of a customer may be computed and found to be, let us assume, 350 kwh. per month.

Then a certain percentage of this amount, say 20%, may be considered an allowable variation above and below the average. This gives a lower limit of 280 kwh. and an upper limit of 420 kwh. between which amounts a consumption figure may fall without being singled out for inspection.

Then a record card is perforated with the amount 280 of the lower limit, the amount 420 of the upper limit and the figure for the power consumption of the present or current month, say 375 kwh. The card is entered in the machine of the present invention and sensed to detect the value of the perforations.

Three accumulators are provided to receive the amounts sensed. The one subtracting accumulator receives the complement 99720 of the lower limit. The second subtracting accumulator receives the complement 99580 of the upper limit. And the third accumulator adds the amount 375. This last mentioned accumulator is a simple adding totalizer which acts as a storage device for the amount 375 which is subsequently read out, or transferred, from the third accumulator to the other two subtracting accumulators. The result is that the first accumulator contains composite amount 00095, and the second contains the amount 99955. The highest order wheels of the two accumulators are sensed by devices which control the sorting of the record card.

Three sorting pockets are provided to separate the record cards; the first receives the cards containing an amount below the lower limit, the second sorts the cards with amounts above the upper limit and the third receives all other cards, namely, those having amounts falling within the normal or allowable range of the limits.

When a "0" is sensed on the highest order wheel of the first accumulator and a "9" is sensed on the highest order of the second accumulator, as in the present problem, it is an indication that the amount falls within the allowable range, and the first two pockets are passed by the card which is deposited in the third pocket.

Another problem may be set up by taking the same limits with a smaller amount for the assumed monthly figure to illustrate what happens when an amount falls below the lower limit.

It may be assumed that the consumption is 275 kwh. Then, when the amount is transferred from the storage accumulators, to the two subtracting accumulators it is found that the first accumulator contains the composite amount 99995, and the second contains the amount 99855. The highest order wheels in both accumulators each contain a "9". This obviously differs from the result in the first problem where the two accumulators held different amounts in the highest orders. The sensing of two "9's" is an indication that the amount is less than the lower limiting amount, and the first pocket is opened to receive the record card.

A third problem may be set up with the same limits, but a larger amount for the assumed monthly consumption in order to point out what happens when an amount is above the upper limit.

Assuming that the consumption is 435 kwh, the composite amount accumulated in the first accumulator is 00155, and the second accumulator registers 00015. Both highest order wheels contain "0". The sensing of two "0's" is an indication that the amount is greater than the upper limiting amount. A means for sensing the two "0's" operate to open the second sorting pocket to receive the record card.

In view of the foregoing description of an illustrative use of the invention, it is apparent that the record cards may be sorted into three groups. One group comprises the cards containing amounts larger than the upper limiting amount, a second group comprises all cards containing amounts smaller than the lower limiting amount, and the third group is made up of all other cards containing amounts within the allowable range of the limits.

The devices of the invention are flexible in the control of sorting so that if desired all cards containing amounts other than those within the allowable limits may be directed into one pocket instead of two. With such control, only two pockets are used, one to receive all cards with amounts within the allowable range, and the other to gather all cards with amounts smaller or larger than the limiting amounts. Thus, no distinction is made between cards bearing amounts above and below the allowable limits.

These objects and other features of the invention will be apparent as the description continues with reference to the drawings which form part of the specification.

Figures 2, 3, 12:
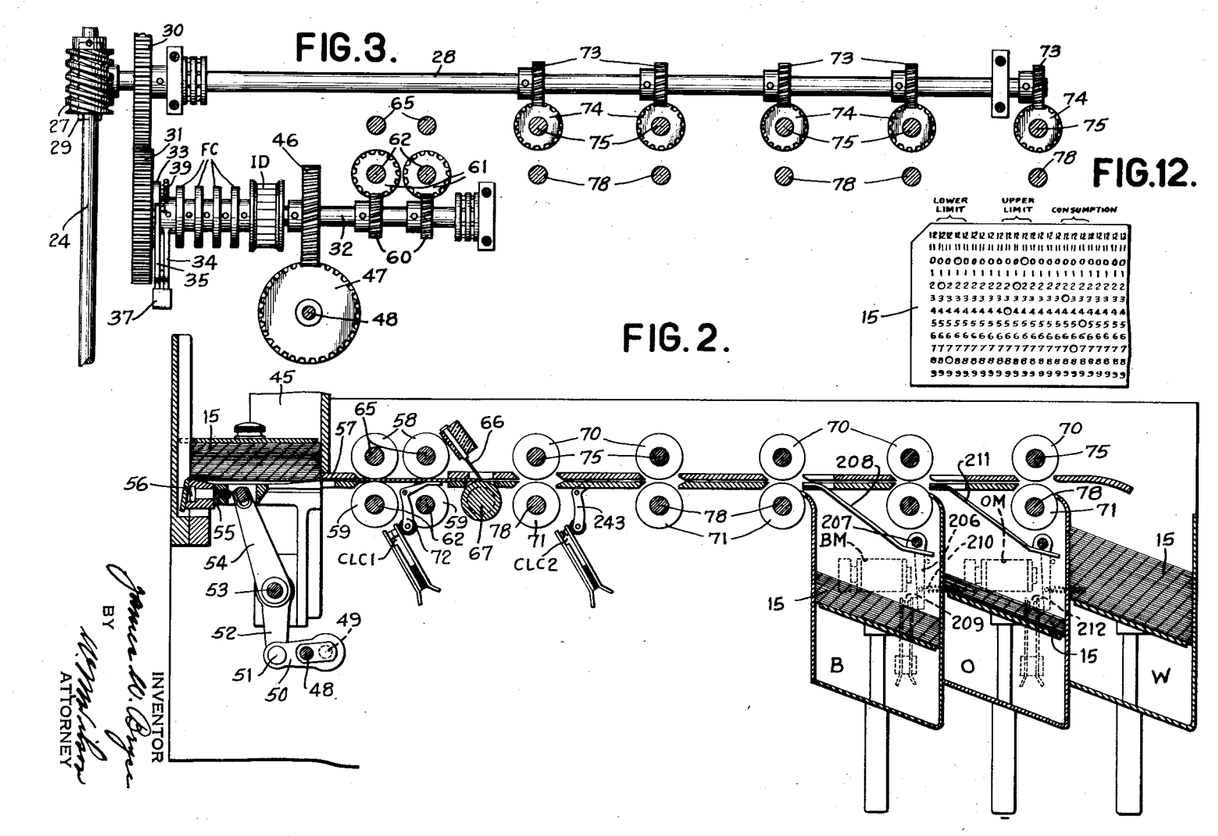
Fig. 2 is a sectional elevation view taken through the record card feeding, sensing and sorting sections of the machine.
Fig. 3 is a side elevation view of the drive shafts and gearing for the card feeding mechanism.
Fig. 12 is a portion of a perforated record card bearing a lower limiting amount 280, an upper limiting amount 420 and an actual consumption amount 375.

The machine is controlled by record cards such as the card 15 shown in Fig. 12. This is the usual form of Hollerith card wherein each perforation located at a differential position in a column, represents a denominational value of a number. The card is shown bearing all three amounts used to control the machine. It is obvious that these amounts could be placed singly or in combination on separate cards.

Figure 1:
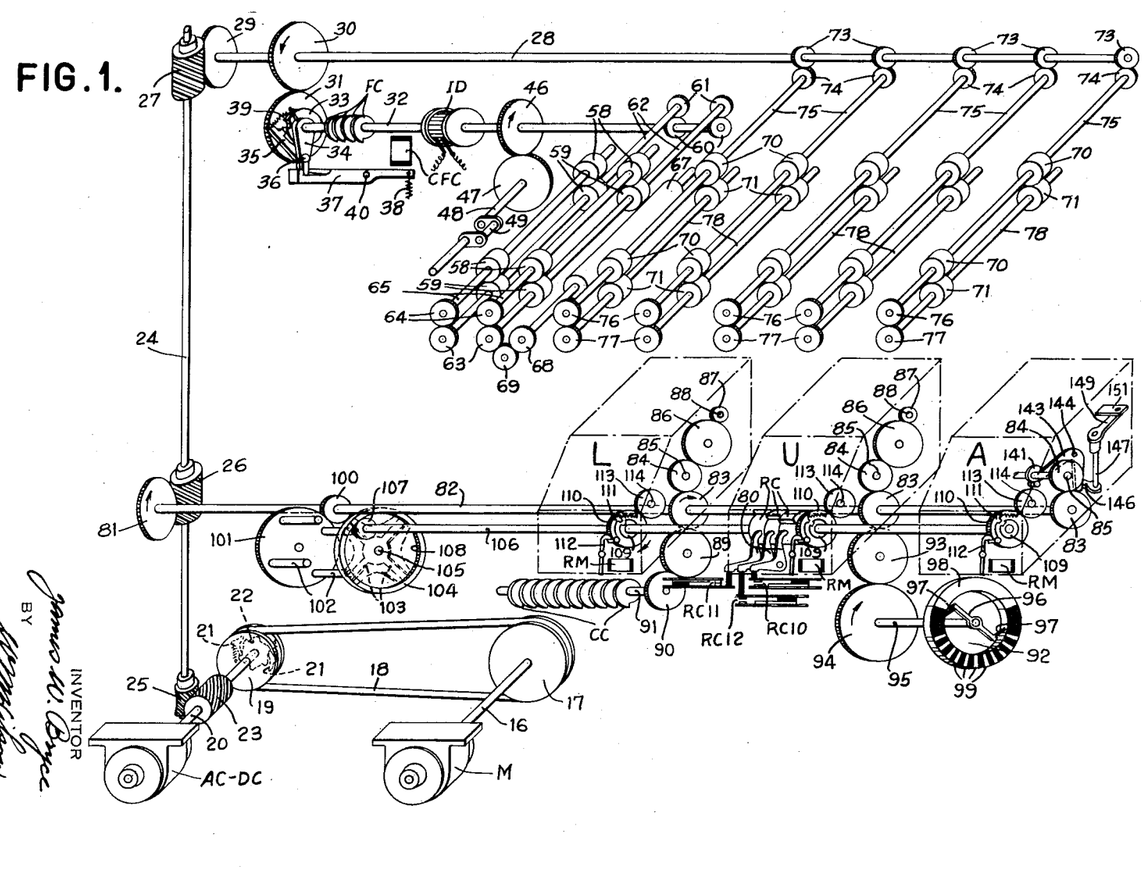
Fig. 1 is a perspective view of the driving mechanism of the machine.

Referring to Fig. 1, it is noted that the machine is driven by a motor M which turns a shaft 16 carrying a pulley wheel 17. A belt 18 connects pulley 17 to another wheel 19 which is mounted loosely on a shaft 20. Pivoted on the side of the wheel 19 are pawls 21 adapted to cooperate with a ratchet gear 22 fastened to shaft 20, and thus they drive the shaft in one direction whenever motor M is effective. The shaft 20 carries a helical driving gear 23 and operates a combined generator A. C.-D. C.

A vertical shaft 24 carries a helical gear 25 in mesh with gear 23. Two worm gears are also fixed on shaft 24, the one gear 26 drives the accumulator operating devices and the other gear 27 drives the card feeding devices.

In mesh with the gear 27 is a worm wheel 29 which is fastened to a card feed drive shaft 28. The shaft carries a gear 30 which meshes with a card feed clutch driving gear 31 mounted loosely on a card feed shaft 32. Attached to the side of gear 31 is a notched driving disc 33. Adjacent the disc is an arm 34 fastened to shaft 32. The arm carries a pawl 35 pivoted at 36 and adapted to cooperate with the disc 33. A short arm on the pawl and an extension are normally engaged by a hooked end of a clutch latch lever 37 pivoted at 40. Thus, the clutch is held disengaged and the shaft 32 is stationary until a card feed clutch magnet CFC is energized to attract one end of lever 37 and move it counterclockwise against the tension of spring 38. Then, as pawl 35 is released, a spring 39 urges it into cooperation with the constantly rotating disc, and the shaft 32 is turned through a single revolution after which the arm 34 and pawl 35 are again latched by lever 37. The magnet CFC is energized intermittently during operation of the machine under control of devices described hereinafter with reference to Fig. 11.

Figure 11:
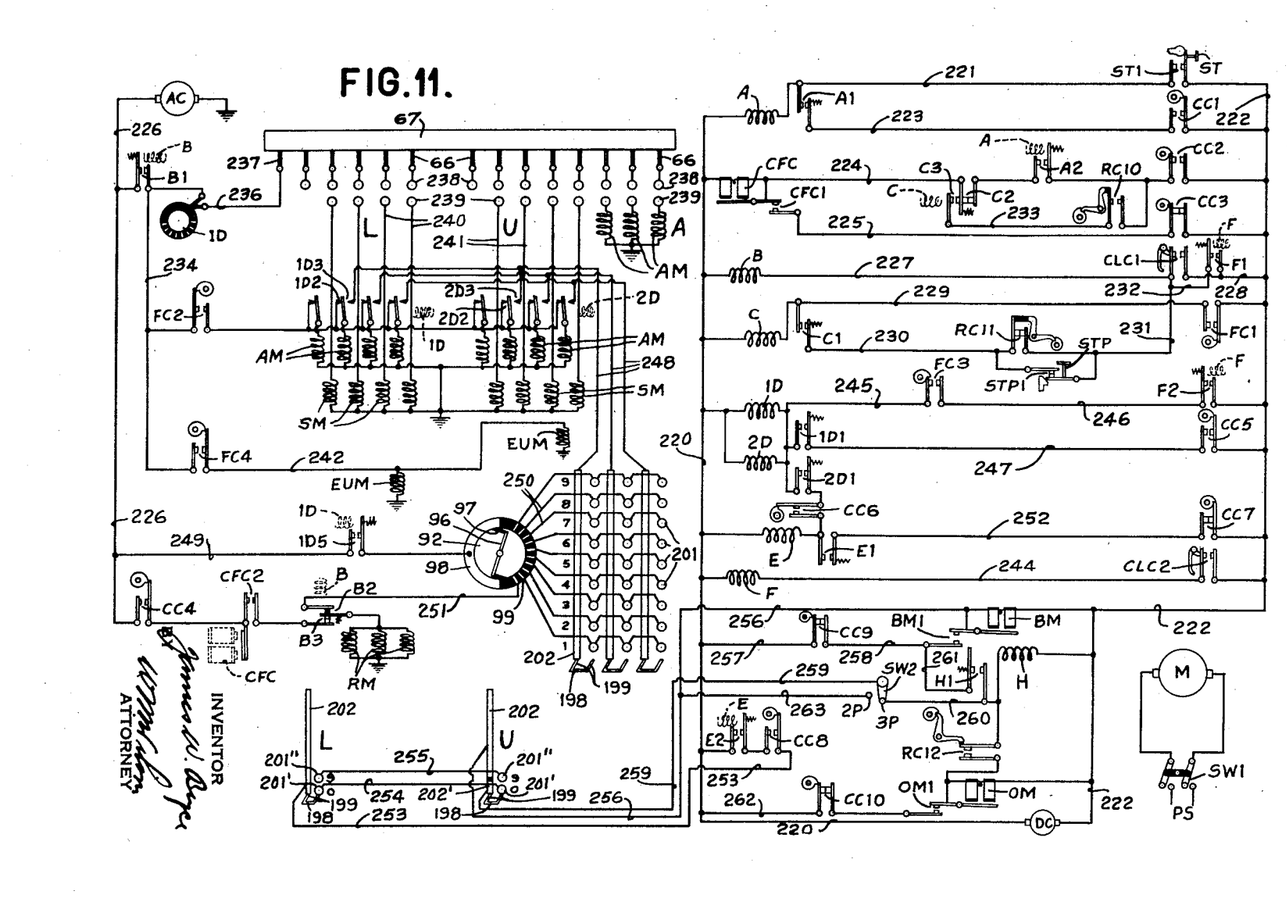
Fig. 11 is a wiring diagram of the machine.

A series of cams FC and an impulse distributor ID are also mounted on shaft 32. The cams operate contacts shown and described in connection with the wiring diagram in Fig. 11. The distributor ID is also shown in Fig. 11.

The devices for picking a card 15, Fig. 2, off the stack in the magazine 45 are operated by driving connections to shaft 32, Fig. 1. A helical gear 46 on shaft 32 meshes with another helical gear 47 fixed to a shaft 48 formed with a crank 49. A link 50, Fig. 2, encircles crank 49 and at the other end is pivoted at 51 to an arm 52 secured to a shaft 53. The shaft carries an upwardly extending arm 54 which is articulated on a picker slide 55 carrying a picker knife 56. The knife extends a slight amount above the slide so that every time the slide is reciprocated by a revolution of shaft 48, the bottom card 15 is engaged at the left end by the picker and then shoved to the right through the throat opening 57.

After issuing out of the magazine, the card is engaged by two sets of feeding rollers 58, 59 driven by shaft 32. Referring to Figs. 1 and 3, it is noted that a pair of helical pinions 60 are attached to shaft 32. These pinions 60 are in mesh with similar pinions 61 on shafts 62 carrying the lower feed rollers 59. At the other end of shafts 62, spur pinions 63 mounted thereon are in mesh with pinions 64 fixed to shafts 65 which carry the upper feed rollers 58. The card is carried along by the rollers 58, 59 and fed between a line of sensing brushes 66, Fig. 2, and a contact roller 67 which is driven by a gear 68 Fig. 1, in mesh with an idler gear 69 cooperating with one of the gears 63.

As the card passes between the rollers 58, 59, it operates a card lever 72 to close the card lever contacts CLC1.

Before the card leaves the right set of rollers 58, 59, it is engaged by the first set of a series of five sets of constantly rotating feed rollers 70, 71. These rollers are driven by gearing connections to the constantly rotating shaft 28. A series of helical pinions 73 are mounted on shaft 28, Figs. 1 and 3. These pinions mesh with other pinions 74 attached to transverse horizontal shafts 75 carrying the upper card feeding rollers 70, Figs. 1 and 2. At the end of each shaft 75 there is fixed a spur pinion 76 which meshes with a similar pinion 77 on a shaft 78 carrying the lower feed rollers 71.

By means of the driving connections traced from motor M to feed rollers 70, 71, these five sets of card feeding rollers are rotated constantly as long as the motor is energized. The rollers are spaced along the line of feeding so that the card 15 is placed between the rollers of one set before leaving the rollers of a previously engaged set as the card passes from left to right in Fig. 2. After a card is first engaged by the left set of rollers 70, 71, it is moved steadily to the right to the selected sorting pocket.

The three accumulators L, U and A provided in the machine are shown diagrammatically in Fig. 1. In this view there may be traced the driving connections from the vertical shaft 24 to the two subtracting accumulators L and U, and the adding accumulator A. The worm gear 26 on shaft 24, meshes with a worm wheel 81 on a horizontal shaft 82. This shaft 82 carries three driving gears 83, one for each accumulator. The gears 83 mesh with other gears 84 attached to clutch driving shafts 85 in the accumulators. The two subtracting accumulators have additional gear connections to gear 84 in the form of idler gears 86 which drive pinions 87 fixed on subtraction ratchet driving shafts 88. Thus the shafts 85 and 88 are driven to rotate constantly as long as shaft 24 is operated.

Other connections are made to shaft 82 in order to drive a series of cams CC which open and close contacts that are discussed hereinafter. An idler gear 89 meshes with one of the gears 83 and drives a gear 90 fastened to a shaft 91 carrying the cams CC.

An impulse emitter 92 is also driven by shaft 82. An idler gear 93 is in engagement with a gear 83 and also meshes with a gear 94 on the shaft 95 which carries the brush frame 96 of the emitter. As one of a pair of emitter brushes 97 on frame 96 is drawn along the common contact sector 98, the other brush engages one after another of the insulated segments 99. One revolution of shaft 82 causes a half revolution of shaft 95 for one complete impulse emitting operation. The reading out function of the emitter in cooperation with commutator devices in the adding accumulator A, are discussed hereinafter with reference to the wiring diagram in Fig. 11.

The accumulators are reset by devices driven by shaft 82. A pinion 100 on the shaft meshes with a gear 101 from which protrude a set of four equally spaced pins 102. These pins engage successively in grooves 103 which are cut in the side of a gear 104 pivoted at 105. The connection is of the form of a Geneva drive wherein the driven gear 104 comes to rest momentarily and then is turned with a gradually accelerated and decelerated motion during each cycle. The intermittent motion of gear 104 is imparted to a shaft 106 by means of a planetary gear transmission. A pinion 107 on shaft 106 meshes with teeth 108 cut in the inside of a shoulder on gear 104.

Attached to the shaft 106 are three notched discs 109 which are situated adjacent loosely mounted gears 110 carrying pawls 111 adapted to engage the notches in the discs. Normally, the pawls 111 are held latched out of engagement by latches 112 which have extensions that are adapted to engage short arms on the pawls. Associated with each latch 112 is a resetting magnet RM which, when energized, attracts one end of the latch and rocks it to release the related pawl 111. The released pawl is drawn into engagement with the disc 109, and thereby the gear 110 carrying the pawl is rotated through one complete revolution after which the pawl is again disengaged by the latch. As the gears 110 revolve they drive gears 113 and rotate resetting shafts 114 connected thereto.

A set of cams RC are attached to one of the gears 110 for rotation on a resetting cycle. It is immaterial which gear 110 is used for this connection, because all three gears are rotated simultaneously when the magnets RM are energized for resetting the accumulators. The cams RC operate bell cranks 80 to open and close contacts RC10, RC11 and RC12. These contacts effect various controls which are more apparent in the wiring diagram of Fig. 11.

Figure 7:
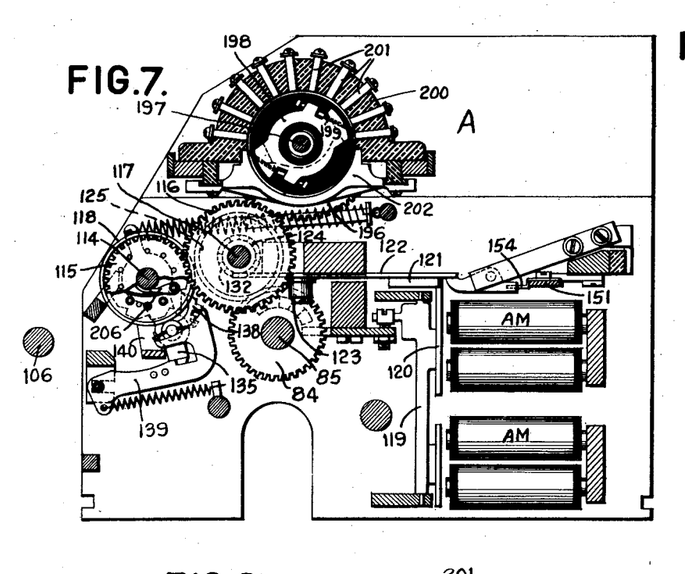
Fig. 7 is a sectional elevation view of part of the entry receiving adding accumulator.

The foregoing sections of the description explain the operating and resetting connections on the exterior of the accumulators. At this point it is believed well to describe briefly the interior accumulating control mechanism of the accumulators. Most of this mechanism shown in Figs. 4, 5, 7, 8 and 9 is of a well known form. Adding is controlled by differentially timed impulses which are initiated by the perforations in cards such as card 15, Fig. 12, as the cards pass under the sensing brushes 66, Fig. 2. The adding magnets AM, Fig. 7, are thus energized at timed instants to enter data corresponding to the reading of the cards.

Figures 4, 5, 6:
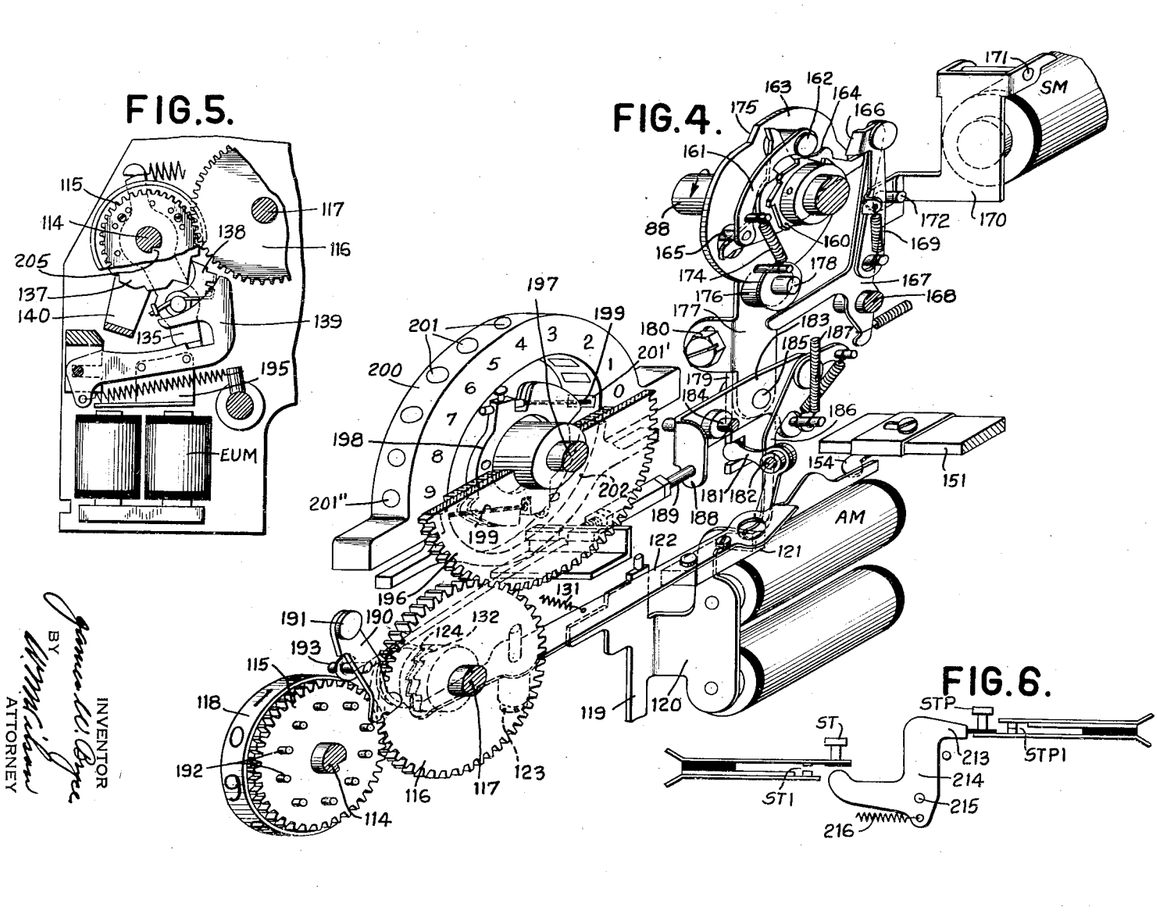
Fig. 4 is a perspective view of one order or bank of a subtracting accumulator.
Fig. 5 is a side elevation view of a carrying mechanism with a magnet for operating it to enter an elusive unit.
Fig. 6 is a detail view of an interlock between the start and stop keys.

In Fig. 7 there is shown a section through accumulator A. Much of the mechanism in accumulator A also appears in accumulators L and U (an order of which is shown in Fig. 4) the difference between the two types of accumulators being due to the extra subtracting or complement entering mechanism in accumulators L and U.

There is provided an adding magnet AM for each order of the accumulator. Cooperating with each magnet is a vertical member 119 pivoted on ends in the frame and carrying an armature 120 facing the magnet pole. An upper extension on this pivoted armature member engages a stop block 121 on the end of a clutch lever 122 pivoted to swing horizontally on a stud 123. The other end of the clutch lever is rounded and fits in a groove cut into a clutch collar 124 which is rotatable with a shaft 117 that is constantly driven by the drive shaft 85 through a gear 125 on shaft 117 meshing with the gear 84 on shaft 85.

When magnet AM is energized, armature 120 is attracted and rocks on the frame so that the extension disengages the stop block 121 on the clutch lever. The latter being unlatched is urged by spring 131, Fig. 4, to move the clutch collar ratchet teeth into mesh with coacting teeth 132 on a gear 116 freely rotatable on shaft 117. An accumulator wheel gear 115 is in mesh with gear 116. This wheel 115 carries an indicating wheel 118 so that the data entered may be displayed.

The magnets AM are energized at a point in the cycle proportional to the value of the designations on the card 15. The designations are in the form of perforations variously located from a given datum line in fixed index positions. The value of a perforation is fixed by the index position it occupies. As the card feeds past the analyzing brushes 66, the positions successively reach the brushes at correspondingly successive points of the cycle in synchronism with the rotation of shaft 117 and clutch collar 124. When a brush encounters a perforation, it makes contact therethrough and completes a circuit energizing magnet AM at a time proportional to the value of the perforation. The energization of the magnet effects rotation, in the manner described, of the related accumulator wheel which turns an amount corresponding to the value of the perforation. For example, if a "9" perforation be sensed by the brushes, the wheel will rotate through nine digit spaces. If the wheel initially reads 0, after the rotation through nine digit spaces it will read 9. However, if the wheel initially reads 2, after the rotation through nine digit spaces it will read 1, therefore a transfer must be effected to the wheel of the next higher denominational order to turn the latter one digit space.

The transfer devices, Figs. 5 and 7, are of a well known form, including levers 135 mounted on the shaft 114 one lever alongside each notched cam wheel 137. A pawl 138 on lever 135 cooperates with the cam 137 and when operated by the passing of the wheel from nine to zero, serves to depress a latch arm 139 holding the higher order lever 135 in normal position. The released lever carries the attached pawl 138 to the left, one step around the notched wheel, in position to operate the wheel. The transfer movement of levers 135 is actuated by a bail 140 through connections effective to move it counterclockwise at the proper time after entry of amount.

As pointed out, the clutch levers 122 are selectively unlatched by armatures 120 upon energization of the magnets AM during the adding cycle. At the end of the adding cycle, the released clutch levers must be relatched by the armatures to thereby disengage clutch collars 124 from the accumulator wheel actuating gears 116, and thus stop rotation of the wheels. The relatching operation is effected during a card cycle by the following mechanism:

Referring to Fig. 1, coacting with a cam 141, rotated once per card cycle by the shaft 85, is a follower mounted on one arm of a bell crank 143 pivotally mounted on a stud 144. Cam 141 has a projection designed to give said bell crank 143 a thrust each card cycle after the adding operation to move said bell crank in a counterclockwise direction. The other arm of the bell crank bears against an extension 146 fixed at an angle to a vertical shaft 147 rotatably journalled in the frame. At the opposite end of the aforementioned shaft 147 is fixed an arm 149 pivoted to one end of a flat bar 151 extending the width of the accumulator. The other accumulators L and U have similar relatching mechanisms which have been omitted in Fig. 1 for the sake of clearness.

A plurality of similar members 154 adjustably mounted on bar 151 are provided with projections adjacent the free ends of the clutch levers 122, as shown in Fig. 4, there being a member 154 for each clutch lever. When cam 141, Fig. 1, rocks the bell crank 143 counterclockwise, the lower arm thereof engages extension 146 on shaft 147, thus rocking shaft 147 clockwise. Arm 149 fixed to shaft 147 thereupon actuates bar 151 to the right as viewed in Fig. 4, with the result that the projections on members 154 move towards clutch levers 122 and press against the ends of those clutch levers which have been unlatched, moving the stops 121 on said levers behind armature latches 120 which thereupon engage the stops to relatch the levers. This relatching action occurs at the end of the accumulating cycle.

It is noted from the foregoing description that adding operations are performed by establishing a clutch connection to drive an accumulator wheel when a perforation is in registration with the correlated analyzing brush and continuing such relation until the end of the cycle. For example, if a "2" perforation is analyzed, the clutch connection is established at the seventh point in the cycle and discontinued at the ninth point to cause an entry of two units on the related accumulator wheel.

Subtracting operations are effected by the complemental process based upon the theory that one number may be subtracted from the other by the addition of the true complement of the subtrahend. In record controlled machines, it is desirable that the perforated data represent only the true number of an amount to be subtracted because in certain tabulating operations it may be desirable to employ such cards for adding the amounts as well as subtracting them. The conversion of the true numbers to true complements is effected automatically in the present machine. In the event that the perforation represents a value of 2 it will be recognized that the "nines" complement or seven units must be entered in the adding wheel to subtract by the complemental process. In the present machine such operations are taken care of by energizing all the accumulator magnets AM at the beginning of the subtracting cycle so that armatures 120 release the levers 122 and the clutch devices will immediately cause the accumulator element to be turned. Such rotation continues until a point is reached when a perforation is analyzed, causing energization of a subtraction magnet SM and disestablishment of the clutch device. As that is the point at which the clutch device is ordinarily rendered effective in ordinary adding operations, it will be understood that the adding wheel receives a complemental entry. The structural details whereby the clutches may be rendered ineffective at differential times coincident with the perforations reaching the analyzing brushes may best be understood by reference to Fig. 4. Only one order of mechanism is shown since the other subtracting orders are similar. The structure is part of the invention disclosed in application Serial No. 672,388, filed on May 23, 1933.

Before turning to Fig. 4 it is well to note that in Fig. 1 a gear 84 drives an idler 86 which has driving connections with a pinion 87 secured upon a shaft 88, the ratio being such that shaft 88 makes two revolutions for one revolution of shaft 117, Fig. 4. Secured to shaft 88 are a plurality of clutch elements 160, one for each denominational order position of the accumulator. Cooperating with each element is a clutch dog 161 pivoted at 162 on a cam 163 freely mounted on shaft 88. Also freely mounted on the shaft is a triple-armed member 164, one arm of which engages a pin 165 in the free end of dog 161 to hold the latter out of engagement with the driving element 160. Each of the arms of member 164 is adapted to cooperate in turn with a pawl 166 which is carried by clutch element 167 pivoted at 168. The pawl 166 is resiliently mounted on element 167 through spring and pin connection 169. A magnet armature 170 pivoted at 171 and having a pin 172 in a laterally extending arm thereof is adapted, upon energization of subtracting magnet SM, to rock element 167 in a clockwise direction to release member 164 thereby permitting spring 174 to rock the element in a counterclockwise direction through pin 165 and at the same time permit the engagement of dog 161 with the driving element 160. The cam 163 will thus be driven in a counterclockwise direction until the next arm of member 164 is engaged by pawl 166, which then causes disengagement of the clutch and interruption of further movement of the cam. The cam 163 is provided with three notches 175 about its periphery, into which a roller 176 rises successively.

Upon the initial movement of cam 163, the higher, concentric portion of the cam depresses roller 176 and with it a slider 177 upon which the roller is pivoted. A pin 178 extending axially from roller 176, engages a horizontal arm of element 167 to cause the positive restoration of clutching pawl 166 and armature 170 immediately after the clutching action. Slider 177 has adjustably connected thereto a slider 179 which is vertically positionable with respect to slider 177, as by screw and slot connection 180. The lower extremity of slider 179 is provided with a notch into which the horizontal arm of bell crank 181 is fitted.

The bell crank is pivoted at 182 and its depending arm lies adjacent to an edge of the clutch arm 122 so that the downward movement of slider 179 will cause the bell crank 181 to engage and move arm 122 in a de-clutching direction at a time determined by the time of energization of magnet SM which is controlled by a circuit extending through the record card 15 and brush 66, Fig. 2.

It is desirable at the time of de-clutching of the adding mechanism to cause the positive restoration of the armature 120 of magnet AM which ordinarily would not be positively restored until the end of the cycle. This is effected through an arm 183 pivoted at 184 and having connection with the slider 177 through a stud 185. Arm 183 carries a spring-pressed pivoted finger 186 whose downwardly extending portion is adapted to engage the armature 120 and move it away from the magnet AM. A spring 187 is provided to raise arm 183 and slider 177 after they have been depressed.

Arm 183 is also provided with an offset finger 188 which engages a horizontally slidable rod 189 whose opposite end is connected through a pin 193 to a finger 190 pivoted at 191. The free end of finger 190 lies near the path of a set of pins 192 on the accumulator gear 115 and the finger will be moved into cooperation with one of the pins 192 at the time that de-clutching is effected, as just described. This will prevent overthrowing of the accumulator wheel which might otherwise take place due to the high speed at which this mechanism is operated.

The mechanism described is effective to add the nines complement of an amount into an accumulator. This nines complement must be filled out or completed by the addition of an elusive unit before it becomes the tens complement which is needed in subtraction by the complemental process. The mechanism by means of which the elusive unit is entered into the accumulator is illustrated in Fig. 5. The units order of each of the two subtracting accumulators has associated therewith a magnet EUM whose armature 195 is secured to the carry lever latch 139 of the units order so that energization of magnet EUM will trip the units pawl carrying arm 135 whereby, during the carrying portion of the machine cycle, the pawl 138 associated with the units order will advance the units wheel one step.

It is explained at the beginning of this specification that the amount entered into the adding accumulator A is sensed or read out and transferred to the other accumulators L and U. In order to do this commutators and brushes shown at the top of the accumulator A in Fig. 7 are provided to get a reading of the position of the accumulator wheels 115.

In mesh with the gear 116 which drives accumulator gear 115, is another gear 196 loosely pivoted on a shaft 197. The gear 196 carries thereon, but insulated therefrom, a brush holder 198 with a pair of brushes 199. Arranged in an arc about shaft 197 is a commutator ring 200 containing a set of segments 201 one for each digit, and a contact sector 202. As one brush 199 contacts the sector 202 the other brush 199 contacts any one of the segments 201 according to the position of the accumulator wheel and gear 196.

Figure 8:
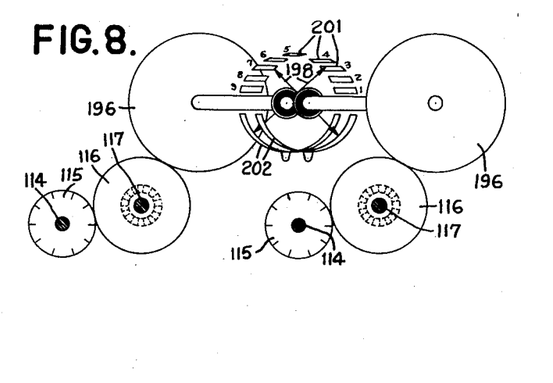
Fig. 8 is a diagrammatic view of the commutator devices used to take a reading of the amount registered in an accumulator.
Figures 9, 10:
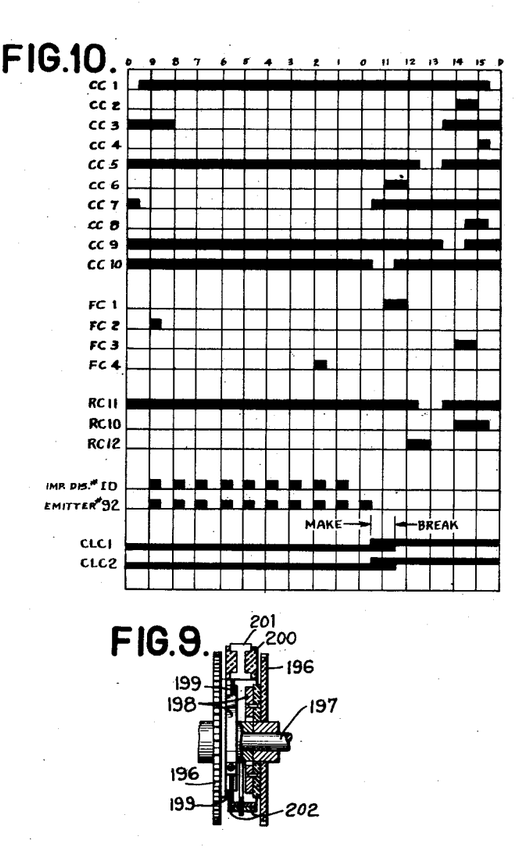
Fig. 9 is a detail view partly in section showing two denominational order brush setting wheels of an accumulator cooperating with a common commutator.
Fig. 10 is a timing diagram showing the sequence of operation of the various contacts in the machine.

In Fig. 8 is a diagrammatic showing of two orders of the commutators devices with the wheels positioned to represent an amount of 37. The actual construction of two orders is shown in Fig. 9 with two sets of brushes cooperating with one set of commutator segments.

The segments 201 are connected to the segments 99, Figs. 1 and 11, of the emitter 92. The emitter directs differentially timed impulses through the segments 201 in order to control the accumulation by circuits closed through the positioned brushes as described more fully hereinafter with reference to the wiring diagram.

The two subtracting accumulators L and U are also provided with reading devices or position sensing commutators in the highest order or bank of each accumulator. These commutator devices are used to determine whether the subtracting accumulator holds a true number or a complement. This may be determined by sensing to find if a zero or a nine is registered in the highest order. As shown in Fig. 4, the commutator device in the subtracting accumulator are similar to the reading devices in the adding accumulator in Fig. 7, and therefore similar reference numerals are used to identify the various commutator parts. The zero segment 201' and the nine segment 201'' are the parts used to sense the nature of the amount in the subtracting accumulator.

After each accumulator sensing and card sorting operation it is necessary that the accumulators be reset before they are adjusted again under control of another record card. It is already explained that shafts 114, Fig. 1, are rotated every time magnets RM are energized. These shafts 114, Figs. 5 and 7 are notched at 205 so that when the shafts are turned, pawls 206 on the accumulator wheels 118 are engaged and moved with the shaft so that the wheels are brought back to the normal, zero indicating position.

The record card is directed into one of three sorting pockets B, O or W, Fig. 2, under control of the amount sensing devices in the highest orders of the subtracting accumulators, after the card has been sensed and the amounts thereon accumulated. If a card contains data below the lower limit it is placed in pocket B. If the data is over the upper limit the card is directed into pocket O. And if the data is within the limits the card passes the first two pockets and falls into pocket W. The pockets are opened and closed by magnets BM and OM the energization of which is described with reference to the wiring diagrams in Fig. 11. When magnet BM is energized it attracts an armature 206 outside pocket B fastened to a shaft 207 carrying a sorting vane 208 inside the pocket. The vane is swung clockwise to assume a position blocking the horizontal path of the card and directing it down into the pocket. The armature 206 cooperates with contacts 209 to hold them closed when operated. A spring 210 restores the vane 208 to a lowered position when the magnet BM is deenergized. The other sorting pocket O is operated in a similar way under control of a magnet OM which adjusts a vane 211 and contacts 212. If neither magnet is energized, then the vanes remain lowered and the horizontal path of the record card is unobstructed so that the card may continue moving to the right until it falls into pocket W.

The start and stop keys in the machine are provided with an interlock to prevent the release of the stop key, once it is depressed, before the operation of the start key.

As shown in Fig. 6, the stop key STP when depressed operates to open contacts STPI. At the same time the key is latched down by the hooked end 213 of a bell crank latch 214 pivoted at 215. A spring 216 tends to hold the latch in locking position. The other end of the latch is in the path of the start key ST which when depressed closes contacts STI and operates latch 214 to release stop key STP and open contacts STPI.

Before describing the electrical control devices of the machine with reference to the timing diagram in Fig. 10 and the wiring diagram in Fig. 11, it may be well to point out briefly the sequence of operation of the various functions of the machine. First a card is fed from the magazine and at the the same time the three accumulators are reset to make sure they are clear. Next, the card is analyzed and the complements of the limiting amounts are entered in the subtracting accumulators while the actual consumption amount is added in the adding accumulator. Then the amount in the adding accumulator is read out and transferred to the other two accumulators. At the end of the reading out operation, the highest order wheels of the two subtracting accumulators are tested to determine whether they contain complements or true numbers, and the sorting devices are operated thereby. Then the operations are repeated under control of the second card, the first card being sorted as the accumulators are reset and while the second card is being analyzed.

Referring to Fig. 11 it is noted that the closing of switch SWI connects the motor M to the power source PS for operation. The motor then drives the generators AC and DC to prepare the machine for comparing and sorting the cards.

After the record cards 15, Fig. 2, are in the magazine 45, the operator presses the start key ST, Fig. 11, closing contacts STI and energizing a magnet A through a circuit including generator DC, line 220, magnet A, wire 221, contacts STI and line 222 back to the generator.

The energized magnet A operates contacts A1 to establish a holding circuit and contacts A2 to condition the card feeding clutch magnet CFC for operation. The start key may be released after a momentary depression because the magnet A is held energized by a holding circuit including contacts A1, wire 223 and contacts CC1 which are closed throughout most of the cycle, as illustrated in Fig. 10.

When contacts CC2 are closed the magnet CFC is energized by a circuit from line 220, through magnet CFC, wire 224, contacts C2, contacts A2, and contacts CC2 to line 222. The energized magnet CFC acts to operate the clutch shown in Fig. 1, so that the card picker and feed rollers start to draw the first card out of the magazine and the FC cams start to operate the related contacts. The magnet also operates contacts CFC1, Fig. 11, to establish a holding circuit, and close contacts CFC2 to initiate a resetting operation.

The holding circuit for magnet CFC may be traced from line 220, through magnet CFC, contacts CFC1, wire 225, contacts CC3 held closed long enough to ensure operation of the card feed clutch, and then back to the generator DC through line 222.

Immediately after the closing of contacts CC2 and CC3, Fig. 10, and the operation of contacts CFC2, Fig. 11, contacts CC4 are closed to complete the resetting circuit, so that resetting of the accumulators is carried on simultaneous with the feeding of the first card up to the sensing brushes. The circuit through the three resetting magnets RM may be followed through generator AC, line 226, contacts CC4, contacts CFC2, contacts B3 normally closed, magnets RM and back to the ground. The energized magnets RM operate the accumulator clutches shown in Fig. 1 to turn shafts 114, Fig. 7. At the same time the cams RC, Fig. 1, operates the reset cam contacts.

All the CC, FC and RC cams for contacts are operated during the initial card feeding and resetting cycle.

Near the mid-point of the card feeding and resetting cycle, the card 15, Fig. 2, operates the card lever 72 and closes contacts CLC1, Figs. 10 and 11, to energize magnet B. An instant later the contacts FC1 close to energize magnet C. These magnets condition the machine for another card feeding cycle during which the card is sensed and the accumulators are operated.

The circuit through magnet B leads from line 220, through magnet B, wire 227, contacts CLC1, and wire 228 to line 222. Magnet B then closes contacts B1 to connect the card reading and accumulator control mechanism for operation. The magnet B also closes contacts B2 and opens contacts B3 to shift the resetting control from operation under control of card feeding to operation under control of the emitter after reading accumulator A.

Magnet C is energized by current through line 220, magnet C, wire 229, contacts FC1 and line 222. The magnet then closes associated contacts C1 to establish a holding circuit through magnet C, contacts C1, wire 230, stop key contacts STP1 or through reset contacts RC11 to complete a cycle should the stop key be depressed at an intermediate point, wire 231, contacts CLC1 and wire 228 to line 222. Contacts C3 are closed momentarily by the energized magnet C so that when contacts RC10 and CC2 close at the end of the resetting cycle, magnet CFC is again energized for another card feeding cycle to draw the record card under the sensing brushes 66. The circuit may be followed from line 220 through magnet CFC, wire 224, contacts C3, wire 233, contacts RC10, contacts CC2 and line 222.

The double card feeding operation is an incident only to the starting operation of the machine. After the first card passes, all other cards are fed with a single card feed and read operation which is interspersed between a resetting operation and an emitting operation. As a card is being read, the picker pushes the next card up to reading position. The intermittent card feed operation is initiated by the closing of contacts RC10 at the end of a resetting operation. Card feeding is interrupted after one cycle of operation by the opening of contacts CC3 during the cycle to deenergize clutch magnet CFC so that the card feed clutch is latched at the end of the cycle.

Early in the card reading and accumulating cycle, the contacts FC2 are closed at the "9" index point to energize the magnets AM in the two subtracting accumulators L and U, and start the wheels turning in these accumulators. The circuit may be traced from the generator AC, line 226, contacts B1, wire 234, contacts FC2, contacts ID2 normally closed, and then in multiple through all the magnets AM in both subtracting accumulators L and U and back to the ground.

The moving record card 15 is sensed between the contact roller 67 and brushes 66. There are three sets of brushes 66 which sense the three perforated zones on the record card 15, Fig. 12, and lead to the three accumulators. One set of brushes senses the lower limit perforations and carries impulses to the magnets SM of the accumulator L. Another set of brushes senses the upper limit perforations and is connected to the magnets SM of the accumulator U. And the third set of brushes senses the actual consumption perforations and sends the resulting impulses to the magnets AM of accumulator A.

The circuit through the subtracting magnets SM of accumulator L may be followed in Fig. 11, from generator AC, through contacts B1, impulse distributor ID, wire 236, contact brush 237, contact roller 67, then through the card when a perforation is encountered by brush 66, plug socket 238, a plug wire to plug socket 239, wire 240 and magnet SM to the ground. In a similar way the magnets SM in accumulator U are energized at differential times by impulses over wires 241 leading to the brushes 66 sensing the upper limit perforations. The energized magnets SM, Fig. 4, operate, as explained hereinbefore, to declutch the accumulator gears at the differential point so that complements of the amounts on the card are entered into the accumulators. Taking the example set forth by the card 15 in Fig. 12 with a lower limit of 280 and an upper limit of 420, the amount 9719 is added in accumulator L and the amount 9579 is added in accumulator U. During the subtracting operation the contacts FC4 are closed to energize the elusive unit entering magnets EUM in the units orders of the subtracting accumulators over a circuit from generator AC, through contact B1, wire 234, contacts FC4, wire 242 and through both magnets EUM and back to the ground. The transferring devices in Fig. 5 operate after data entry to add a unit in both accumulators so that accumulator L registers an amount of 9720 and accumulator U holds the amount of 9580.

The circuit through the adding magnets AM of accumulator A may be traced from generator AC, through contacts B1, impulse distributor ID, wire 236, brush 237, contact roller 67, the set of brushes 66 at the right, sockets 238, plug wires to sockets 239, and through magnets AM to the ground. The energized magnets AM, Fig. 7, act to clutch the adding gears to the driving means at times controlled by perforations in the actual consumption zone on the record card 15, Fig. 12, so that an amount of 375 is added in accumulator A. This amount is manifested by the displacement of brushes 199, Figs. 7 and 11, to contact the proper segments 201 in the commutator devices at the top of accumulator A.

At the end of the card reading cycle, the card picker and feed clutch pawl 35, Fig. 1, is latched and shaft 32, cams FC and the impulse distributor ID are held stationary throughout the next cycle. This occurs because magnet CFC is deenergized by the opening of contacts CC3 during the card reading cycle. Therefore, although contacts BI are maintained closed during the following read out amount transferring cycle, no impulses will flow into the accumulator from the brushes 66 or through contacts FC2 and FC4, because shaft 32 carrying the impulse distributor ID, contacts FC2 and contacts FC4 is held stationary.

Near the end of the card reading and accumulator operating cycle, the contacts CLC2, Figs. 2 and 11, are closed when the card lever 243 is operated by the moving card 15. This serves to energize a magnet F through a circuit from line 220, through magnet F, wire 244, contacts CLC2 and line 222. This circuit is maintained through a large part of the following cycle. The energized magnet F closes contacts F2 in preparation for the energization of magnets ID and 2D which control the reading out or amount transfer from accumulator A to accumulators L and U. Soon after the closing of contacts F2, contacts FC3 are closed and a circuit is completed through magnet ID, as follows: line 220, magnet ID, wire 245, contacts FC3, wire 246, contacts F2 and line 222.

When energized, magnet ID closes contacts IDI to make a stick circuit through both magnets ID and 2D. The circuit may be traced from line 220, then in parallel through magnets ID and 2D, contacts IDI, wire 247, contacts CC5 closed before contacts IDI and held closed through most of the following cycle, and then to line 222. The energized magnet 2D closes associated contacts 2D1 to prepare for the subsequent energization of magnet E when contacts CC6 are closed late in the following cycle.

The energized magnets ID and 2D also open contacts ID2 and 2D2, and close contacts ID3 and 2D3 to prepare the accumulators L and U respectively, for the reception of emitted impulses directed through the commutator devices of accumulator A. The shifting of the contacts connects the magnets AM in the subtracting accumulators to contact sectors 202 in accumulator A by wires 248.

The energized magnet ID also acts to close contacts ID5 so that the emitter 92 is made effective on the subsequent cycle.

When the end of the card reading cycle is reached, all the preliminary operations have been made as described hereinbefore, so that the machine is conditioned to read out the amount 375 in the accumulator A and add it to the complements in accumulators L and U. The reading operation starts when the emitter brush 97 strikes the first segment 99 which is connected to a commutator segment 201 touched by a brush 199. The commutator segments are connected to the emitter segments in an inverse order, as may be seen in Fig. 11, so that the "9" segments 201 are adapted to receive the first impulse, the "8" segments 201 the second impulse, etc. It happens that in the problem mentioned, the "7" segment 201 in the tens order is the first to transmit an impulse. The circuit may be traced from generator AC, through line 226, wire 249, contacts ID5, emitter sector 98, one brush 97, frame 96, the other brush 97, segment 99, wire 250, all "7" segments 201, brush 199, frame 198, the other brush 199, sector 202 in the tens order, wire 248, contacts ID3 and 2D3 in the tens orders, magnets AM and then to the ground.

The energized magnets AM in the accumulators L and U act to clutch the adding gears in time to add a seven before the end of the operation. In a like manner, the emitter sends differentially timed impulses through the other orders of the commutator devices so that both subtracting accumulators are operated to add the amount 375, the result being that accumulator L registers 0095 and accumulator U reveals the total amount 9955.

As the emitter nears the end of the reading out cycle, it serves to energize magnets RM to initiate a resetting operation which takes place on the subsequent cycle. The circuit runs from generator AC, through line 226, wire 249, contacts ID5, sector 98, brush 97, frame 96, the other brush 97, the last segment 99, wire 251, contacts B2 and through magnets RM to the ground.

The contacts CC6 are closed near the end of the reading out cycle and thereby magnet E is energized by a circuit extending from line 220, through magnet E, contacts CC6, contacts 2D1, contacts ID1, wire 247 and through contacts CC5 to line 222. The energized magnet E prepares a stick circuit by closing contacts E1 which are in line with contacts CC7 held closed until after the end of the cycle. The holding circuit for magnet E includes line 220, magnet E, contacts E1, wire 252, contacts CC7 and line 222.

The energized magnet E also closes contacts E2 in preparing for a circuit to test the commutator devices in the highest orders of the accumulators L and U to determine whether complements or true numbers are held therein and thereby control sorting. The standing of the highest order wheels at "9" or "0" indicates whether the actual consumption amount 375 is within limits, below limits or above limits. It may be noted from the foregoing description that the example being followed up to this point, resulted in the highest order wheel in accumulator L standing at "0" and the highest order wheel of accumulator U being at "9". Soon after the closing of contacts E2 and before the end of the cycle, contacts CC8 are closed to prepare further for a commutator sensing or a testing circuit.

With the high order wheels conditioned as they are assumed to be, no circuit is closed through contacts E2 and CC8 and sorting magnets BM and OM are not energized. The electrical connections are partially completed through line 220, contacts E2, contacts CC8, wire 253, sector 202 in accumulator L, brushes 199 and frame 198, segment 201', wire 254, segment 201; and there the connections end because brush 99 of the highest order in accumulator U is not contacting the segment 201'. Therefore, with neither magnet BM or OM energized, the vanes 208 and 211, Fig. 2, remain lowered because the data on the card are between or within the limiting data, and the card continues to move past the related pockets O and M and over to the pocket W for the cards having data within limits.

For the purpose of explaining the selective sorting control of the machine, the example taken of the punching of the record card 15, Fig. 12, may be changed to assume that the actual consumption amount is 275 instead of 375. It is noted that the amount now considered is less than or below the lower limiting amount 280, the limiting amounts being assumed to be the same as in the first example. When the amount 275 is read out of accumulator A and added to the complemental amount 9720 in accumulator L and the complement 9580 in accumulator U, the result is that accumulator L is turned to 9995 and accumulator U registers 9855. The highest order wheels of both accumulators are at "9" when testing takes place. This is an indication that the data is below the limits. Then at the proper time, when contacts E2 and CC8 are closed, a circuit is completed through the sorting magnet BM. The circuit may be followed from line 220, through contacts E2, contacts CC8, wire 253, sector 202 in accumulator L, frame 198 and brushes 199 touching "9" segment 201" wire 255, "9" segment 201" in accumulator U, frame 198 and brushes 199, sector 202, wire 256, magnet BM and line 222. The energized magnet BM closes contacts BMI to prepare for a holding circuit which is completed when contacts CC9 close and remain closed for most of the following cycle. The holding circuit may be traced from line 220, through wire 257, contacts CC9, wire 258, contacts BMI, magnet BM and line 222. Magnet BM operates the vane 208, Fig. 2, and holds it raised on the subsequent resetting cycle as the record card 15 is fed into the pocket B for cards having data below or less than the lower limiting amount.

Another example may be considered by assuming that the actual consumption amount is 435. This amount is greater than or over the upper limiting amount 420. When the amount 435 is read out of accumulator A and added to the complement 9720 in accumulator L and the complement 9580 in accumulator U, the result is that accumulator L is turned to 0155 and accumulator U is operated to read 0015. The highest order wheels of both accumulators are at "0" when testing takes place. This is an indication that the data on the card is over the upper limit. Then when the contacts E2 and CC8 are closed, a circuit is prepared to energize the sorting magnet OM. The circuit may be followed from line 220, through contacts E2, contacts CC8, wire 253, sector 202 in accumulator L, brushes 199 and frame 198, "0" segment 201', wire 254, "0" segment 201' in accumulator U, brushes 199 and frame 198, a small sector 202' insulated from sector 202, wire 259, through switch SW2 set to contact terminal 3P for sorting in three pockets, then on through wire 260 and magnet H to line 222. Magnet H closes contacts HI to make a holding circuit from line 220, through wire 257, contacts CC9, wire 258, wire 261, contacts HI, magnet H and line 222. This circuit is prepared so that near the end of the reset cycle, when contacts RC12 are closed before contacts CC9 open, and the card is near the end of the vane 211, Fig. 2, the magnet OM is energized to lift the vane and cause sorting of the card in pocket O. The circuit energizing magnet OM includes line 220, wire 257, contacts CC9, wire 258, wire 261 contacts HI, contacts RC12, magnet OM and line 222. The energized magnet OM closes associated contacts OMI to establish a holding circuit to hold it energized as long as contacts CC10 are kept closed, which is shortly after the middle of the card feeding and sensing cycle which occurs subsequent to the resetting cycle. The circuit is held to allow time for the card to feed under vane 211 into the pocket O. Included in the holding circuit are line 220, wire 262, contacts CC10, contacts OMI, magnet OM and line 222. Thus, the cards containing consumption amounts larger than or over the upper limiting amount, are sorted and grouped in pocket O.

The mode of operation used in connection with the examples described hereinbefore is designed to separate the record cards into three groups according to whether the amounts thereon are below, over or within the limiting amounts. Other control may be selected to separate the cards into only two groups, those with data within the limits and those with data outside the limits. To select two-pocket sorting control, the switch SW2 is moved to contact terminal 2P. Then magnet BM is energized whenever a card is encountered having data below or over the limits. The below limit circuit through wire 256 and magnet BM is the same as that described hereinbefore, but the above limit circuit through wire 259 is changed and directed to magnet BM instead of magnet H. The change is made at switch SW2 where wire 259 is connected through the switch to terminal 2P and wire 263 to wire 256 leading through magnet BM. Thus, all cards containing data either below or over the limiting amounts, are directed into the pocket B, and all other cards with data within limits are fed into pocket W. The pocket O is not used when operating with the switch SW2 set for sorting in two groups.

After the machine is started, it continues to run with the three successive cycles of resetting, card feed and reading and emitting being repeated over and over again as long as cards are sensed. Sorting takes place at the same time as resetting and card feeding. As explained hereinbefore, at the end of each emitting cycle the magnets RM are energized to start a resetting cycle. Then as resetting ends, contacts RC10 are closed to start a card feeding and reading cycle at the end of which, contacts FC3 are closed to start another emitting cycle. This sequence of operation continues until the card lever contacts CLC1 and CLC2 are opened when the card magazine is empty and cards fail to feed. As the last card passes through the machine, the contacts CLC1 are allowed to open before the card is fully sensed. Unless these contacts are shunted at that time, the magnet B would be deenergized and the resetting operation which normally follows the data comparing operation would not be initiated. A shunt is provided in the form of wire 232 and contacts F1 extending across contacts CLC1. These contacts F1 are operated by magnet F which is energized as soon as the last card operates the second card lever CLC2. This happens before the first card lever CLC1 is released, therefore the energization of magnet B is sustained.

The indicating wheels 118 on the highest order wheels in the subtracting accumulators may be observed to act as a means for indicating the result of the comparison of the actual amount with the limiting amounts. Directly after the limiting cycle, before the wheels are tested, these wheels stand at "0" or "9" and thus indicate the result of the comparison before sorting takes place.

It is to be understood that various omissions, substitutions and changes in the structure and mode of operation of the devices illustrated may be made by those skilled in the art without departing from the spirit of the invention. This invention is limited therefore, only as indicated by the scope of the following claims.

What is claimed is as follows:

1. In a record controlled machine, means for sensing a record, means under control of said sensing means for entering amounts appearing on the record, a pair of accumulators, means under control of the entering means for adding the complement of an upper limiting amount in one accumulator, means under control of the entering means for adding the complement of a lower limiting amount in the other accumulator, means under control of said entering means for adding an amount to be compared with said limiting amounts in said accumulators, means for testing the positions of the highest order wheels in said accumulators to determine whether they are at "9" or "0", and means under control of said testing means for sorting the record according to whether the amount compared is below, over or within the limiting amounts.

2. In a perforated record controlled machine, means for sensing perforations on said record representing limiting amounts and an amount to be compared with said limiting amounts, means under control of said sensing means for entering said amounts, an accumulator controlled by said entering means to add the complement of a lower limiting amount, another accumulator controlled by said entering means to add the complement of an upper limiting amount, a storage accumulator controlled by said entering means to add the amount to be compared, commutator devices adjusted by said storage accumulator, an emitter cooperating with said devices and said complement adding accumulators, means for operating said emitter to read the amount in said storage accumulator and add similar amounts in said complement adding accumulators, commutator devices adjusted by the higher order wheels of said complement adding accumulators, and means under control of the last mentioned devices for sorting the record according to whether the amount thereon is below the lower limiting amount, over the upper limiting amount, or within the limiting amounts.

3. In a sorting machine controlled by records perforated with a lower limiting amount, an upper limiting amount and a third amount to be compared with said amounts, means for sensing the record perforations, an accumulator controlled by said sensing means to add the complement of the lower limiting amount, another accumulator controlled by said sensing means to add the complement of the upper limiting amount, devices for adding elusive units in the two accumulators, a storage accumulator controlled by said sensing means to add said third amount, commutator devices adjusted by said storage accumulator, an emitter connected to said complement adding accumulators through said commutator devices, means for operating said emitter to read out and transfer the amount in said storage accumulator to each of said complement adding accumulators, testing means cooperating with both of said complement adding accumulators to determine whether they hold complement or true numbers, sorting devices controlled by said testing means to sort said records in any of three ways according to the magnitude of said third amount thereon whether it be below, over or within the limits set by the limiting amounts.

4. In a record controlled machine, means for sensing a record, means for ascertaining the relative value of amounts, means under control of the sensing means for entering two limiting amounts and an amount into said ascertaining means so that the magnitude of the last mentioned amount may be ascertained with relation to said two limiting amounts, three sorting pockets, means under control of said ascertaining means for sorting the records in either of two ways; in two pockets, one receiving records with amounts within limits and the other those records with amounts outside the limits, or in three pockets, one receiving records with amounts below the limiting amounts and another the records with amounts within the limits and a third the records with amounts over the limiting amounts, and means cooperating with said sorting means to select the way sorting is to be accomplished.

5. In a card sorting machine, means for feeding a card, means for sensing a card, sorting pockets, accumulating devices, means under control of said sensing means for operating said accumulating devices, means under control of the accumulating devices for directing the card to a particular sorting pocket, other feeding means for delivering the card to the pocket, and a means for preventing further operation of the first mentioned feeding means after sensing the last card while permitting the second mentioned feeding means to operate until all sensed cards are sorted.

6. In a card sorting machine, means for feeding and sensing the cards, accumulating mechanism, means for entering the amounts sensed on said cards into said accumulating mechanism, means under control of the mechanism for sorting the cards, means for resetting the mechanism, a stop key for stopping the card feeding and sensing means, and means under control of the resetting means for continuing operation of the card feeding and sensing means after operation of the stop key.

7. In a machine of the class described, amount entering means for entering complements of limiting amounts and another amount to be compared therewith in the machine, a pair of accumulators under control of said entering means for receiving said complements of limiting amounts, means under control of said entering means for receiving said another amount, means cooperating with said receiving means to add said another amount in both accumulators, means effective after adding for detecting whether the accumulators have assumed positive conditions, and control devies set by said detecting means.

8. In a record controlled machine, a plurality of accumulators, means under control of each record for entering a certain amount and the complements of two limiting amounts into said accumulators, means for determining the magnitude of said certain amount with relation to the other two limiting amounts in said accumulators, and means under control of said determining means for sorting each record according to whether said certain amount thereon is within or without the range of values between the limiting amounts thereon.

9. In a record controlled machine, means for sensing amount representations on said record, means for ascertaining the relative value of amounts, means under control of the sensing means for entering two limiting amounts and an amount into said ascertaining means so that the magnitude of the last mentioned amount may be ascertained with relation to said two limiting amounts, sorting means, and devices under control of said ascertaining means for controlling said sorting means to sort each record according to whether said last mentioned amount is within or without the range of values between the limiting amounts.

10. In a record sorting machine, amount entering means for entering complements of limiting amounts and another amount to be compared therewith in the machine, a pair of accumulators under control of said entering means for receiving said complements of limiting amounts, means under control of said entering means for receiving said another amount, means cooperating with said receiving means to add said another amount in both accumulators, means effective after adding for detecting whether the accumulators have assumed positive conditions, sorting mechanism and devices set by said detecting means for controlling said sorting mechanism to sort each record according to whether said another amount entered in connection therewith is within or without the range of values between the limiting amounts.

JAMES W. BRYCE.